United States Patent [19]

Ballheimer

[11] Patent Number: 4,499,786
[45] Date of Patent: Feb. 19, 1985

[54] COUPLING OF DRIVING MEMBER TO DRIVEN MEMBER

[75] Inventor: Benny Ballheimer, Peoria, Ill.

[73] Assignee: Caterpillar Tractor Co., Peoria, Ill.

[21] Appl. No.: 385,364

[22] Filed: Jun. 7, 1982

[51] Int. Cl.³ .................................................. F02F 7/00
[52] U.S. Cl. ................................ 74/606 R; 123/195 C
[58] Field of Search .................. 74/606 R; 123/195 R, 123/195 C

[56] References Cited

U.S. PATENT DOCUMENTS

| | | | |
|---|---|---|---|
| 1,450,081 | 3/1923 | Henriod et al. | 123/195 R |
| 2,047,420 | 7/1936 | Lee | 74/606 X |
| 2,335,926 | 12/1943 | Fawick | 74/606 X |
| 2,879,092 | 3/1959 | Hargrove et al. | 287/129 |
| 2,969,779 | 1/1961 | Hauser | 123/195 R X |
| 2,974,660 | 3/1961 | Kolbe | 123/195 |
| 3,383,947 | 5/1968 | Higgins | 74/606 |
| 4,265,495 | 5/1981 | Backlin | 308/23 |
| 4,287,861 | 9/1981 | Lettner et al. | 123/195 C X |

FOREIGN PATENT DOCUMENTS

| | | |
|---|---|---|
| 2612182 | 11/1980 | Fed. Rep. of Germany . |
| 3121605 | 3/1982 | Fed. Rep. of Germany . |
| 2638009 | 11/1983 | Fed. Rep. of Germany . |
| 2250953 | 11/1974 | France . |
| 593191 | 12/1944 | United Kingdom . |

Primary Examiner—Kenneth J. Dorner
Attorney, Agent, or Firm—J. W. Burrows

[57] ABSTRACT

A prime mover (10) includes a housing (12), an end cover (18) secured to the housing (12), a driving shaft (22) mounted in the housing (12) and a driven member (49) mounted external of the end cover (18). A coupling mechanism (48) couples the driving shaft (22) to the driven member (49) to provide an arrangement that allows the removal of the driving shaft (22) without having to remove the end cover (18) and other associated elements. This provides a substantial time savings when removing a driving shaft (22) from a prime mover.

5 Claims, 3 Drawing Figures

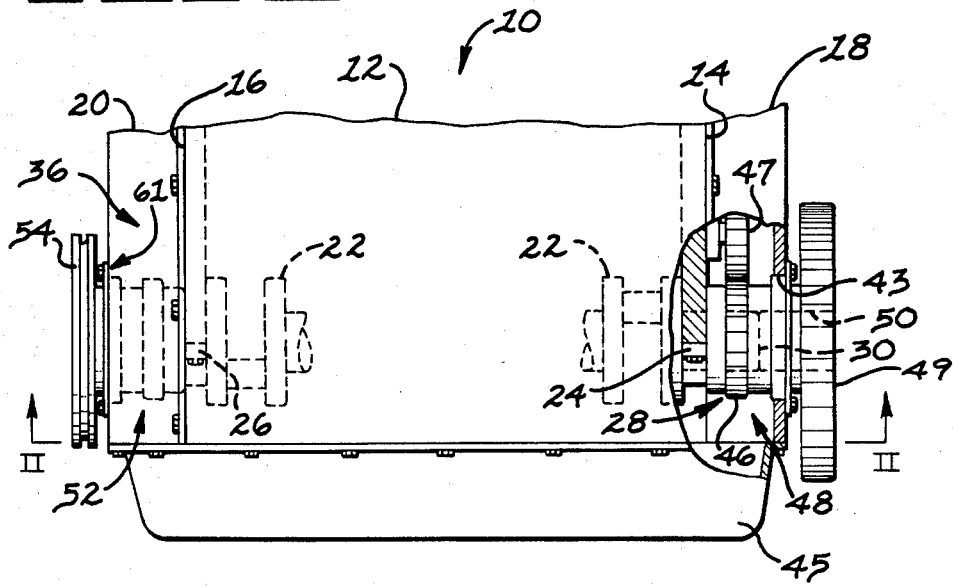
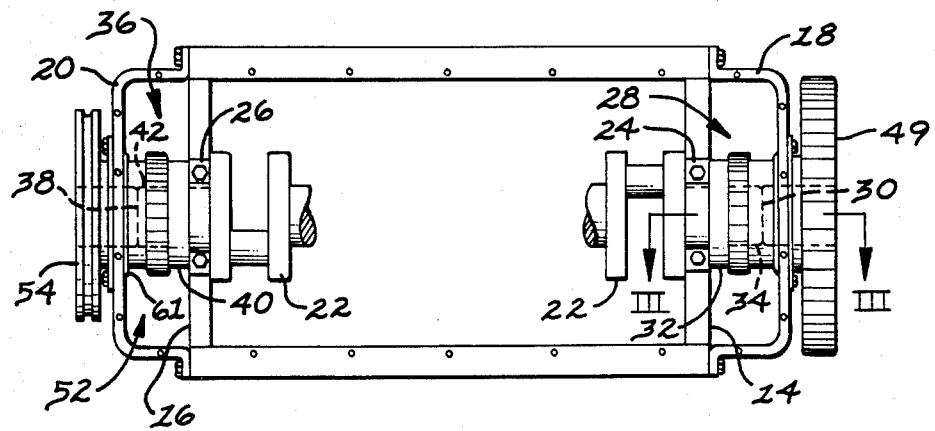

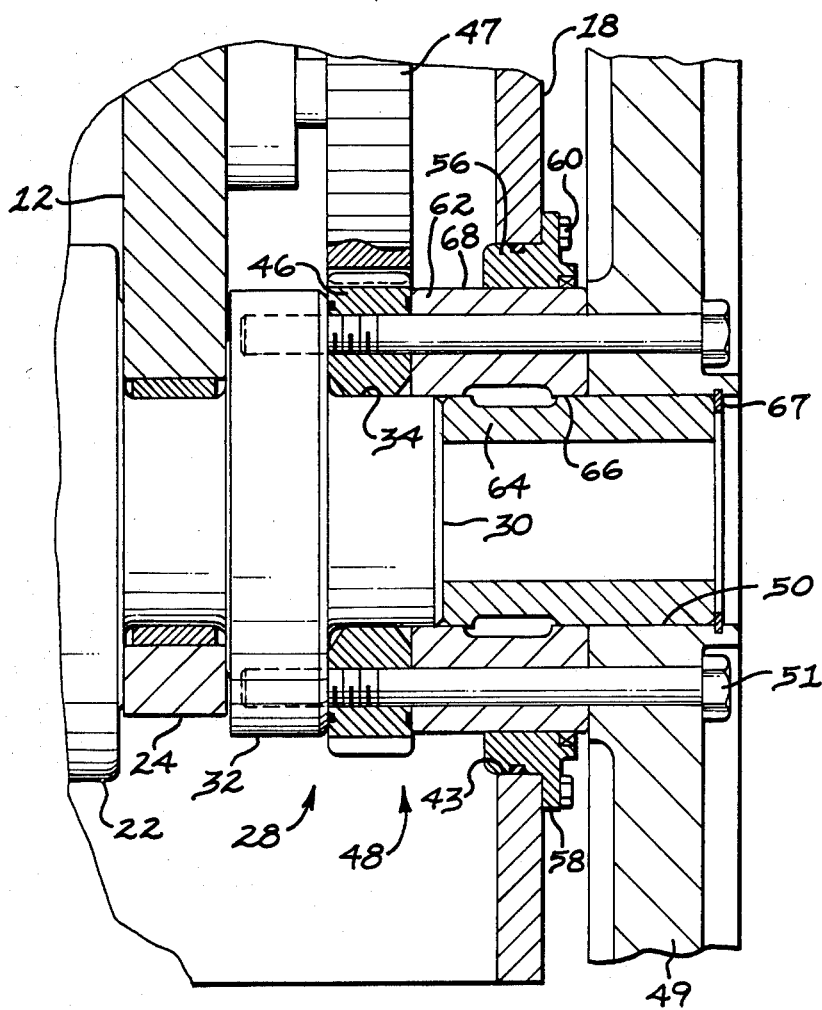

COUPLING OF DRIVING MEMBER TO DRIVEN MEMBER

DESCRIPTION

1. Technical Field

This invention relates generally to a coupling mechanism for coupling a driving member of a prime mover to a driven member and more particularly to having a coupling mechanism that connects the driven member to the end of the driving member without the driving member extending through an end cover of the prime mover.

2. Background Art

Prime movers for use in drive systems normally have a driving shaft, such as a crankshaft, connected to a driven member such as a pump or a transmission to perform various functions. The prime mover normally has an end cover for covering components such as timing gears, lubricating pumps, etc. The end cover is connected to a housing, such as a cylinder block for an engine. The driving shaft extends through a bore in the end cover and connects to the driven member external of the end cover.

One of the problems encountered with such arrangements is in removing the driving shaft. With the driving shaft extending through the bore of the end cover, it is necessary to remove the end cover prior to removing the driving shaft. Removal of the end cover requires removing additional components and their mounting brackets from the prime mover prior to removal of the end cover.

The present invention is directed to overcoming one or more of the problems as set forth above.

DISCLOSURE OF THE INVENTION

In one aspect of the present invention a prime mover has a housing with an end portion, and an end cover defining a bore, the end cover being connected to the end portion of the housing. A driving shaft is mounted in the housing and provides output power from the prime mover to a driven member mounted outside the end cover distal from the driving shaft. The driving shaft has an end portion located inside the end cover. A coupling means couples the driven member to the driving shaft through the bore and the coupling means releases the driven member from the driving shaft for removal of the driving shaft free of removing the end cover.

The problem of having to remove the end cover and associated elements when wanting to remove the driving shaft is overcome by the use of a driving shaft having an end located inside the end cover and a coupling means for coupling the end of the shaft to the driven member. Consequently by removing the coupling means and the driven member, the driving shaft can then be easily removed without removing the end cover.

BRIEF DESCRIPTION OF THE DRAWINGS

FIG. 1 is a diagrammatic representation of an embodiment of the present invention;

FIG. 2 is taken along the line II—II of FIG. 1; and

FIG. 3 is an enlarged sectional view taken at III—III of FIG. 2.

BEST MODE FOR CARRYING OUT THE INVENTION

Referring now to FIGS. 1 and 2, a prime mover 10 has a housing 12 defining first and second end portions 14,16 and has first and second end covers 18,20 connected to the first and second end portions 14,16 respectively. A driving shaft 22, such as a crankshaft, is rotatably mounted to the housing 12, such as a cylinder block, in a well known manner by main bearing caps 24,26. The driving shaft 22 includes an end portion 28 having an end 30 located inside of the end cover 18. Referring also to FIG. 3, the end portion of the driving shaft 22 includes a flange 32 and a pilot diameter 34. The pilot diameter 34 has a smaller diameter than the flange 32 and is located adjacent the end 30 of the driving shaft 22. The driving shaft 22 further includes a second end portion 36 having a second end 38, a second flange 40 and a second pilot diameter 42. The second pilot diameter is adjacent the second end of the driving shaft 22.

Each of the end covers 18,20 is connected to the housing 12 in a conventional manner and define a thru bore 43. A pan 45 is mounted to the bottom of the housing 12 and the end covers 18,20 in a conventional manner.

A gear 46 is mounted on the pilot diameter 34 of the driving shaft 22 for driving an element 47 such as a lube pump. The lube pump 47 is connected to the housing 12 inside the end cover 18.

A means 48 is provided for coupling a driven member 49 which is located outside of the end cover 18 distal from the end 30 of the driving shaft 22 to the driving shaft 22. The driven member 49 as shown is a flywheel. Alternatively, the driven member 49 could be a gear or a shaft for driving a hydraulic pump. The driven member 49 defines a bore 50 for locating the driven member 49 relative to the coupling means 48. A plurality of bolts 51, see FIG. 3, or other suitable fastening means secures the driven member 49, the gear 46 and the coupling means 48 to the flange 32 of the driving shaft 22.

A second means 52 is provided for coupling the second end 38 of the driving shaft 22 to a second driven member 54, such as a pulley. The second driven member 54 is located outside of the second end cover 20 distal from the second end 38 of the driving shaft 22.

Now referring to FIG. 3, a seal 56 is slidably disposed in the thru bore 43 of the end cover 18 and includes a flange 58 for locating the seal 56 relative to the end cover 18. A plurality of bolts 60 connects the flange 58 to the end cover 18.

A second seal 61 similar to the first seal 56 is connected to the second end cover 20 in the same manner as the first seal 56 connects to the first end cover 18.

The first coupling means 48 includes first and second pilot members 62,64. The first pilot member 62 is slidably disposed within the seal 56 and defines a thru bore 66 and a concentric outer diameter 68. The thru bore 66 of the first pilot member 62 is slidably disposed about the pilot diameter 34 of the driving shaft 22. The second pilot member 64 is slidably disposed in the thru bore 66 of the first pilot member 62 and the bore 50 of the driven member 49. The second pilot member 64 is axially restrained by the end 30 of the driving shaft 22 and a snap ring 67 mounted in the bore 50 of the driven member 49.

Elements of the second coupling means 52, as shown in FIGS. 1 and 2, are the same as those previously described for the first coupling means 48 and will not be further described.

Preferably the end 30 of the driving shaft 22 is within the end cover 18 and the first coupling means 48 extends thru the end cover 18. This provides an easier arrangement for removing the driving shaft 22 simply by removing the first coupling means from the end cover 18 without having to remove the end cover 18 from the housing 12.

INDUSTRIAL APPLICABILITY

During removal of a driving shaft from a prime mover, the driven means 49 is disconnected from the first coupling means 48 by removing the plurality of bolts 51. After disconnecting the driven member 49, the seal 56 is disconnected from the end cover 18 and removed along with the first coupling means 48 to free the end 30 of the driving shaft 22. The second driven means 54, the second seal 61 and the second coupling means 52 are removed from the opposite end in a similar manner.

The oil pan 45 is removed and the bearing caps 24,26 are disconnected from the housing 12 and the various connecting rods or other elements normally associated with the driving shaft 22 would be disconnected. The driving shaft 22 is now free to be removed from the bottom of the housing 12 without having to remove the first and second end covers 18,20 since the first and second ends 30,38 of the driving shaft 22 are located within the end cover 18,20.

It should be recognized that the first and second pilot members 62,64 could be made as one piece or that it would also be possible for the driven member 49 and the second pilot member 64 to be a single unit without departing from the essence of the invention.

In order to maintain concentricity between the driving shaft 22 and the driven member 49, the tolerance between the thru bore 66, the outside diameter of the second member 64 and the pilot diameter 34 are held to a minimum.

In view of the foregoing, it is readily apparent that the structure of the present invention provides an improved arrangement for removal of a driving shaft from a prime mover without having to disassemble many other components from the prime mover.

Other aspects, objects and advantages of this invention can be obtained from a study of the drawings, disclosure and the appended claims.

I claim:

1. An apparatus including a prime mover (10) having a housing (12) with an end portion (14), an end cover (18) defining an opening (43) and being connected to the end portion (14) of the housing (12), a driving shaft (22) mounted in the housing (12) for providing output power from the prime mover (10) and having an end (30) terminating inside the end cover (18), a driven member (49) mounted outside the end cover (18), and means (48) for coupling the driven member (49) to the driving shaft (22) through the opening (43) and for selectively releasing the driving shaft (22) from the driven member (49) to enable removal of the driving shaft (22) without removing the end cover (18), comprising:

the driving shaft (22) having a flange and an outer cylindrical surface (34) adjacent the end, the diameter of said outer cylindrical surface (34) being smaller than the diameter of the flange (32), said coupling means (48) including a pilot member (62) having a bore (66) slideably mounted on the outer cylindrical surface (34) of the driving shaft (22) and a concentric outer cylindrical surface (68) extending through the opening (43) of the end cover (18), and including means (51) for drivingly securing the driven member (49) and the pilot member (62) to the flange (32) of the driving shaft (22).

2. The apparatus according to claim 1, including a seal (56) mounted in the opening (43) and being releasably attached to the end cover (18), the pilot member (62) of the coupling means (48) being slidably mounted in the seal (56).

3. The prime mover (10) as set forth in claim 2, wherein said driven means (49) defines a bore (50) and said coupling means (48) includes a second pilot member (64) slidably disposed in the bore (66) of the first pilot member (62) and the bore (50) of said driven member (49) to locate said driven member (49) when said driven member (49) is coupled to said driving shaft (22).

4. The prime mover (10) as set forth in claim 3, wherein said driven member (49) is a flywheel.

5. The prime mover (10) as set forth in claim 1, wherein said housing (12) includes a second end portion (16) and a second end cover (20) mounted on the second end portion (16) of said housing (12), said driving shaft (22) including a second end portion (36) having a second end (38) located inside the second end cover (20), and further including a second driven member (54) and a second means (52) for coupling said second driven member (54) to said driving shaft (22) and releasing said driving shaft (22) from the second driven member (54) to remove the driving shaft (22) free of removing said second end cover (20).

* * * * *